J. C. MIRE.
PULVERIZER.
APPLICATION FILED JUNE 18, 1913.
1,095,911.
Patented May 5, 1914.
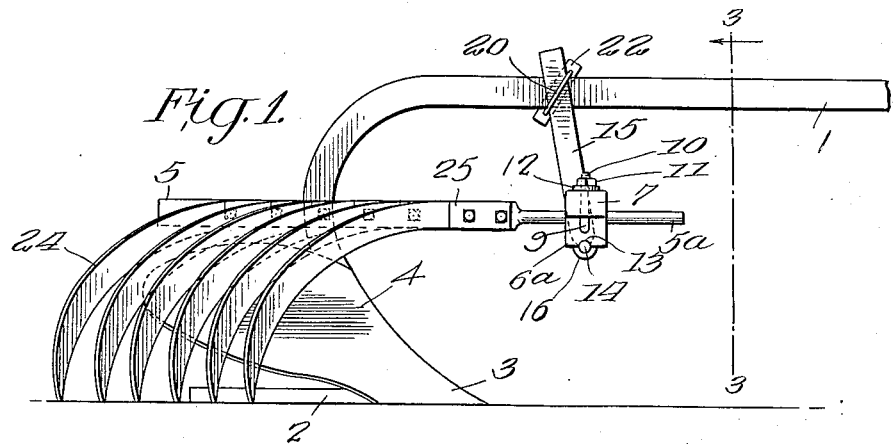
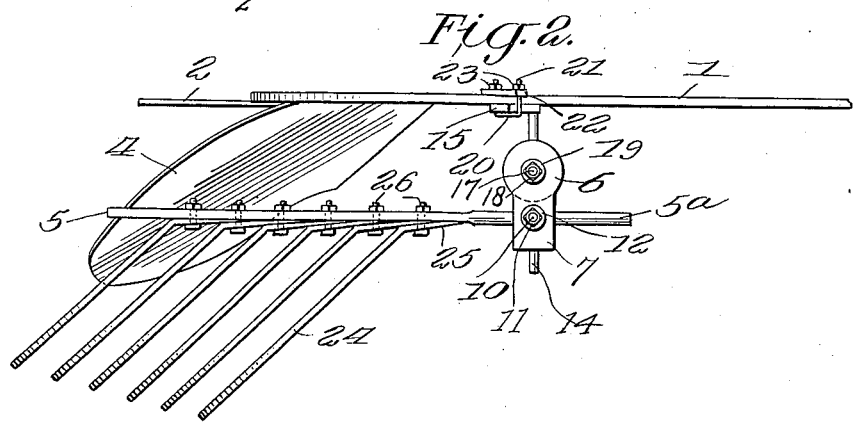
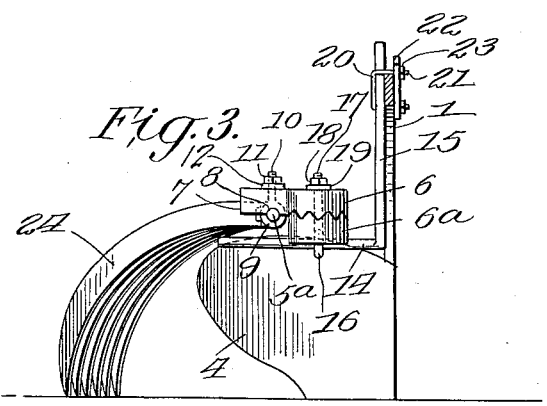
WITNESSES
Samuel E. Wade
C. E. Tranor
INVENTOR
Joseph C. Mire
BY Munn & Co.
ATTORNEYS

UNITED STATES PATENT OFFICE.

JOSEPH C. MIRE, OF DREYFUS, LOUISIANA.

PULVERIZER.

1,095,911.   Specification of Letters Patent.   Patented May 5, 1914.

Application filed June 18, 1913. Serial No. 774,392.

*To all whom it may concern:*

Be it known that I, JOSEPH C. MIRE, a citizen of the United States, and a resident of Dreyfus, in the parish of Iverville and State of Louisiana, have invented a new and useful Improvement in Pulverizers, of which the following is a specification.

My invention is an improvement in pulverizers, and has for its object to provide a pulverizer, of the character specified, especially adapted for pulverizing the soil in the furrow and adapted for connection with a turning plow to pulverize the soil as it is turned.

In the drawings:—Figure 1 is a side view of a turning plow provided with the improved pulverizer, Fig. 2 is a top plan view, and Fig. 3 is a section on the line 3—3 of Fig. 1.

The present embodiment of the invention is shown in connection with a turning plow having a beam 1, a landside 2, a point 3, and a mold board or share 4.

The improvement comprises a bar 5 of rectangular cross section and having its front end rounded or cylindrical as shown at 5ª for connection with a clamp, the said clamp consisting of a pair of sleeves 6 and 6ª, each provided with interengaging clutch teeth on its meeting face, and one of the sleeves, 6 in the present instance, is provided with a radial arm 7. The arm 7 has a transverse groove 8 on its under face, and an eye bolt 9 has its threaded stem 10 passed through an opening in the arm, the said opening being at the bottom of the groove 8, and the said threaded stem is engaged by a nut 11, above the arm. The cylindrical portion 5ª of the bar 5 is passed through the eye of the eye bolt, and is held in the groove 8 by the nut. A washer 12 is arranged between the nut and the upper face of the arm. The arm 6ª has a diametrical groove 13 in its under face, for receiving an angular arm 14 of a bar 15, connected to the beam, and an eye bolt 16 engages the said angular arm and passes through the sleeves 6 and 6ª at their axes, to hold the arm 14 in the groove 13. The stem 17 of the eye bolt is engaged by a nut 18 above the sleeve 6, and a washer 19 is arranged between the nut and the sleeve 6. The bar 15 is held to the beam by means of a U-shaped clip comprising a body 20 and arms 21, the said body being arranged transversely of the bar 15 and the beam, with the arms 21 passing transversely of the side edges of the bar and of the beam.

A plate 22 is arranged transversely of the beam on the opposite side from the bar 15, the said plate having openings for receiving the ends of the arms 21, and nuts 23 are threaded on to the arms on the opposite side of the plate 22 from the beam. The bar 15 is thus adjustably clamped to the beam, and the said bar may be moved longitudinally of the beam, or may be swung angularly with respect to the beam. The clamp comprising the sleeves 6 and 6ª may be also adjusted longitudinally of the cylindrical portion 5ª of the bar 5, by loosening the nut 11 of the eye bolt 9—10. The bar 5 may be also adjusted angularly by loosening the same nut and may be held in its adjusted position by tightening the nut.

A series of pulverizing teeth or bars, each consisting of an arc-shaped portion 24 and an angular portion 25 is secured to the bar 5. The angular portion 25 of the rearmost bar of the series is wedge shaped or beveled on its inner face as shown, and the angular portions 25 of the succeeding bars are lapped upon each other and upon the said portion of the rearmost bar as shown in Fig. 2, and are secured to the bar by means of bolts and nuts 26. The portions 24 of the bars are arranged at an obtuse angle to the portions 25, so that the arc-shaped portion of each of the said pulverizing bars extends laterally and rearwardly as shown. The bar 5 is spaced laterally from the beam about two-thirds the length of the share or mold board, and the bars 24—25 extend beyond the outermost end of the mold board and the full width of the furrow thrown. The free end of the portion 24 of each of the pulverizing bars is pointed as shown in Figs. 1 and 2, and the free ends of the said bars are at the level of the bottom of the share and the point of the plow. The portions 24 of the said bars decrease in length from the front to the rear so that the points of the said bars are staggered as will be evident from an inspection of Fig. 3. The point of each bar from front to rear is slightly inside the point of the preceding bar, so that practically the full width of the furrow is covered.

The pulverizing mechanism, namely, the portions 24 of the bars 24—25 may be adjusted toward and from the beam, longitudinally of the beam, vertically with respect to the beam, and angularly with respect to the direction of motion of the plow. In addition the bar 5—5ª may have its free rear end swung upwardly or downwardly or toward or from the beam.

I claim:—

1. The combination with a turning plow, of a pulverizer for breaking the furrow turned, said pulverizer comprising a supporting bar having its front end rounded, and a series of teeth, said teeth being arranged parallel and in spaced relation and at an angle to the supporting bar, each of the said teeth having its free end pointed and being arc-shaped and arranged with its convex edge upward, said teeth gradually decreasing in length from the rounded portion of the bar to the opposite end, and means for connecting the supporting bar to the beam of the plow, said means comprising sleeves arranged co-axial and having their meeting ends provided with inter-engaging teeth, one of the sleeves having a radial arm provided with a transverse groove for receiving the rounded portion of the bar, an eye bolt engaging the said rounded portion and passing through the arm, a nut engaging the eye bolt for clamping the rounded portion of the bar in the groove, a plate having an angular arm, the other sleeve having a diametrical groove at its outer end for receiving the arm, an eye bolt passing through the sleeves and engaging the angular arm, a nut engaging the eye bolt to clamp the sleeves together and to clamp the angular arm to the sleeves, and a clip for connecting the plate to the beam.

2. The combination with a turning plow, of a pulverizer for breaking the furrow turned, said pulverizer comprising a supporting bar having its front end rounded and a series of teeth, said teeth being arranged parallel and in spaced relation and at an angle to the supporting bar, each of the said teeth having its free end pointed and being arc-shaped and arranged with its convex edge upward, said teeth gradually decreasing in length from the rounded portion of the bar to the opposite end, means for connecting the supporting bar to the beam of the plow, said means comprising sleeves arranged co-axial and having their meeting ends provided with inter-engaging teeth, one of the sleeves having a radial arm, means for clamping the rounded portion of the bar to the arm and for permitting the rounded portion to be adjusted longitudinally of the arm, and a plate having an angular arm, means for adjustably connecting the plate to the beam, and means for adjustably clamping the sleeves together, said clamping means having means for engaging the angular arm to clamp the sleeves to the arm.

3. The combination with a turning plow, of a pulverizer for breaking the furrow turned, said pulverizer comprising a supporting bar having its front end rounded and a series of teeth, said teeth being arranged parallel and in spaced relation and at an angle to the supporting bar, each of the said teeth having its free end pointed and being arc-shaped and arranged with its convex edge upward, said teeth gradually decreasing in length from the rounded portion of the bar to the opposite end, and means for connecting the supporting bar to the beam of the plow.

4. The combination with a turning plow, of a pulverizer for breaking the furrow turned, said pulverizer comprising a supporting bar having its front end rounded and a series of teeth, said teeth being arranged parallel and in spaced relation and at an angle to the supporting bar, each of the said teeth having its free end pointed and being arc-shaped and arranged with its convex edge upward, said teeth gradually decreasing in length from the rounded portion of the bar to the opposite end.

5. A pulverizer for connection with a turning plow, said pulverizer comprising a bar provided with a laterally extending series of parallel spaced teeth, each of the teeth being arc-shaped and arranged with its convex edge upwardly and having its free end pointed, the series of teeth being at one end of the bar and the teeth of the series gradually increasing in length from the said end toward the other end.

6. A pulverizer for connection with a turning plow, said pulverizer comprising a bar having a laterally extending series of arc-shaped teeth, said teeth being at one end of the bar and gradually increasing from the said end toward the other end.

JOSEPH C. MIRE.

Witnesses:
 FELIX N. GROS,
 A. J. CONGER.

Copies of this patent may be obtained for five cents each, by addressing the "Commissioner of Patents, Washington, D. C."